(No Model.)
M. J. SUNDERLIN.
TWO WHEELED VEHICLE.
No. 439,362. Patented Oct. 28, 1890.
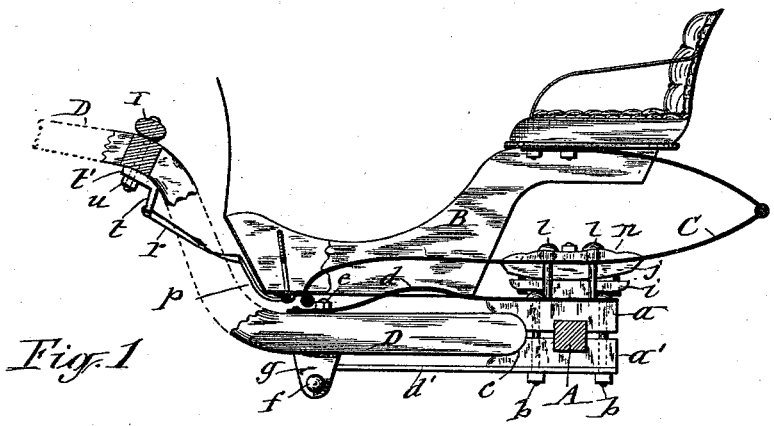
Fig. 1
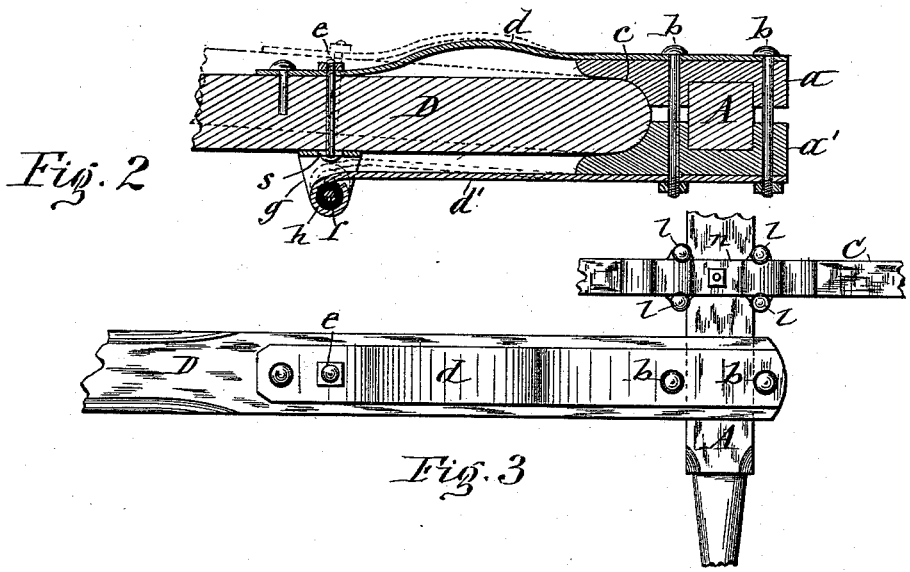
Fig. 2
Fig. 3
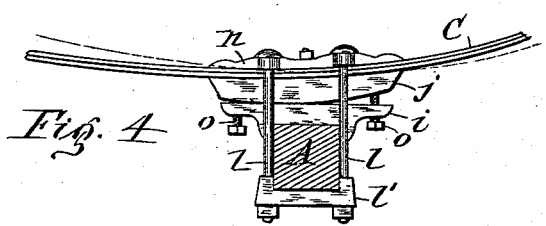
Fig. 4
WITNESSES:
J. J. Laass.
H. M. Seamans
INVENTOR:
Martin J. Sunderlin
BY
Duell, Laass & Duell
his ATTORNEYS

UNITED STATES PATENT OFFICE.

MARTIN J. SUNDERLIN, OF WATKINS, NEW YORK.

TWO-WHEELED VEHICLE.

SPECIFICATION forming part of Letters Patent No. 439,362, dated October 28, 1890.

Application filed August 16, 1890. Serial No. 362,162. (No model.)

*To all whom it may concern:*

Be it known that I, MARTIN J. SUNDERLIN, of Watkins, in the county of Schuyler, in the State of New York, have invented new and useful Improvements in Two-Wheeled Vehicles, of which the following, taken in connection with the accompanying drawings, is a full, clear, and exact description.

This invention relates to the class of two-wheeled vehicles which are designated "road-carts;" and the invention consists, first, in improved means for overcoming the horse motion of the vehicle; secondly, in novel devices for adjusting the body of the vehicle to different angles of inclination longitudinally on its supports on the axle; thirdly, in simple and convenient means for adjusting the elevation of the front end of the body, and, fourthly, in certain peculiarities of the details of the aforesaid devices, all as hereinafter more fully described, and specifically set forth in the claims.

In the annexed drawings, Figure 1 is a side elevation of a two-wheeled vehicle embodying my invention, the wheels being omitted and portions of the axle and thill being broken away to better illustrate my improvements. Fig. 2 is an enlarged longitudinal vertical section of the connection of the thill to the axle. Fig. 3 is a top plan view of the connection of the aforesaid parts, and Fig. 4 is a transverse section of the axle immediately at the side of the body-supporting spring.

Similar letters of reference indicate corresponding parts.

A represents the axle of the vehicle; B, the body; C, the supporting-spring of said body, and D the thill or shaft, which latter I connect to the axle by the following devices:

To the axle I firmly attach a suitable clip, preferably of the form of two plates $a$ $a'$, placed across the top and bottom of the axle and boxed thereon to obtain a secure hold on the front and rear of the axle. These clip-plates are formed with forward extensions, preferably concave on the adjacent sides in front of the axle, and are secured to the axle by means of bolts $b$ $b$, passing vertically through said plates in front and rear of the axle and headed on their upper ends and provided with nuts on their lower ends, as shown in Figs. 1 and 2 of the drawings. The clip thus formed presents a concaved face or recess $c$ in a vertical plane in front of the axle, and in said face or recess is seated loosely the rear end of the thill D, which is in the same plane with the axle and convexed in a vertical plane to conform to the face or recess $c$, against which it abuts. The strain between the thill and the axle is thus maintained in one and the same plane.

To the top of the upper clip-plate $a$ is fastened the rear end of a spring-arm $d$, preferably by means of the bolts $b$ $b$, which fasten the clip to the axle. Said spring-arm is preferably bowed or arched in a vertical plane, and has its front end secured to the top of the thill by a bolt $e$, passing vertically through the thill, or by any other suitable means.

To the under side of the lower clip-plate $a'$ is attached another spring-arm $d'$ by means of the bolts $b$ $b$, hereinbefore mentioned. This spring-arm, which I designate the "check-spring," is extended straight under the thill and terminates with a sleeve-shaped bend or roll, by which it embraces a bolt $f$, which passes transversely through a stirrup $g$, secured to the under side of the thill, preferably by means of the bolt $e$, which fastens the spring-arm $d$. To prevent rattling, I interpose between the bolt $f$ and the surrounding coupling end of the check-spring arm $d'$ a bushing $h$ of rubber or leather or other suitable material, as illustrated in Fig. 2 of the drawings.

In order to allow the check-spring arm $d'$ to be adjusted in its tension, I provide the horizontal or attaching portion of the stirrup $g$ with a slot $s$ parallel with the thill, through which slot the attaching-bolt $e$ passes.

The described connection of the thill to the axle forms a spring-hinge, which allows the thill to oscillate in a vertical plane independent of the axle, and the oscillation is limited by the spring-arms $d$ $d'$. The bowed upper spring-arm $d$ allows the front end of the thill to rise to a certain degree without turning the axle with it, and consequently the rearward tilting of the body is obviated. Said movement of the thill is checked by the lower spring-arm $d'$, which restores the axle and body to their normal positions in relation to the thill. In this manner the transmission of the horse motion to the vehicle is obviated, the draft of the thill comes entirely onto the two spring-arms $d$ $d'$, and in backing the vehicle the rear end of the thill abuts against the concave face $c$ of the axle-clip, and thus relieves the aforesaid spring-arms from compression.

The body B, I render adjustable to different angles of inclination longitudinally by firmly securing to the top of the axle two saddles $i$ $i$, one for each spring C. Upon each of said saddles I mount a head-block $j$, which has its bottom rounded longitudinally, and rides thereby upon a straight top bearing on the saddle, and thus said head-block is adapted to oscillate or to be tilted longitudinally or at right angles to the axle. The spring C is secured to the top of the head-block, and at the same time the latter is retained on the saddle $i$ by means of bolts $l$ $l$ passing through a clip-tie $l'$ on the bottom of the axle and through a cap $n$ upon the spring. Vertically through the end portions of the saddle $i$ in front and rear of the axle pass set-screws $o$ $o$, which bear on the under side of end portions of the head-block and serve to sustain the latter in the desired angle of inclination, as illustrated in Fig. 4 of the drawings.

To the front portion of the interior of the body B, I fulcrum a crank-lever $p$, one arm of which is of the form of a treadle, adapted to receive the pressure of the foot of the rider on the vehicle. The other arm of said lever is extended forward on the under side of the body and is connected by a strap $r$ to a loop $t$, formed on a washer $t'$, which is interposed between the under side of the cross-bar of the thill and the nut $u$ of the bolt by which the whiffletree I is connected to the said cross-bar. By pressing on the treadle of the lever $p$ the front end of the body is raised, and thus excessive forward inclination of the body is prevented when descending a steep hill or when the driver is pulling heavily on the reins of the horse.

What I claim as my invention is—

1. The combination, with the axle, of clip-plates secured, respectively, to the top and bottom of the axle and formed with forward extensions, the thill having its rear end in the same plane with the axle to maintain the strain between said parts in one and the same plane and inserted loosely between the clip-plate extensions, and spring-arms connected at one end to said clip-plates and extending forward therefrom and secured, respectively, to the top and bottom of the thill, substantially as described and shown.

2. The combination, with the axle, of a clip secured to the axle and concaved in a vertical plane in its front, the thill having its rear end convexed in a vertical plane and seated in the concave face of the clip, and spring-arms on top and bottom of the thill and connecting the same to the clip, as set forth and shown.

3. The combination, with the axle, of clip-plates seated on top and bottom of the axle and boxed thereon and formed concaved in their adjacent sides in front of the axle, bolts securing the clip-plates to the axle, the thill having its rear end convexed and seated in the concaved faces of the clip-plates, and spring-arms secured at their rear ends to the top and bottom of the clip-plates by the attaching-bolts of said plates and attached at their front ends to the top and bottom of the thill, substantially as described and shown.

4. The combination, with the axle, of a clip secured to the axle and concaved in a vertical plane in front of the axle, the thill having its rear end convexed in a vertical plane and seated in the concaved face of the clip, a vertically-arched spring-arm secured at opposite ends to the tops of the thill and clip, and a straight check-spring arm connected at opposite ends to the under sides of the thill and clip, substantially as described and shown.

5. In combination with the axle, the clip secured thereto and formed with a concaved face in front of the axle, the thill seated with its rear end in said concaved face, a vertically-arched spring-arm bolted at opposite ends to the tops of the clip and thill, a stirrup seated on the under side of the thill and provided with a slot parallel with the thill and attached to the thill by a bolt passing through said slot, and a check-spring arm secured at one end to the clip and at the opposite end to the aforesaid stirrup, as set forth and shown.

6. In combination with the axle and saddle mounted thereon, a head-block mounted on said saddle oscillatory at right angles to the axle, a seat-supporting spring secured to said head-block, clip-bolts tying the head-block and spring to the saddle, and set-screws passing vertically through the end portions of the saddle and bearing on the under side of the end portions of the head-block, substantially as described and shown.

In testimony whereof I have hereunto signed my name this 12th day of August, 1890.

MARTIN J. SUNDERLIN. [L. S.]

Witnesses:
JOHN GOUNDREY,
JAMES V. PROBASCO.